United States Patent [19]
Uto et al.

[11] Patent Number: 5,886,625
[45] Date of Patent: Mar. 23, 1999

[54] RESIDUAL FUEL AMOUNT-ESTIMATING SYSTEM FOR FUEL TANK OF INTERNAL COMBUSTION ENGINE

[75] Inventors: Hajime Uto, Kawachi; Toshiaki Ichitani, Utunomiya, both of Japan

[73] Assignee: Honda Giken Kogyo Kabushiki Kaisha, Tokyo, Japan

[21] Appl. No.: 26,543

[22] Filed: Feb. 19, 1998

[30] Foreign Application Priority Data

Feb. 25, 1997 [JP] Japan ................................ 9-055467

[51] Int. Cl.⁶ .................................................. B60Q 1/00
[52] U.S. Cl. ........................ 340/450.2; 340/614; 73/113
[58] Field of Search .............................. 340/450.2, 614, 340/618, 626; 73/1.73, 113, 116, 117.2; 123/518, 520, 521

[56] References Cited

U.S. PATENT DOCUMENTS

| | | | |
|---|---|---|---|
| 4,488,970 | 12/1984 | Clark | 340/450.2 |
| 4,734,682 | 3/1988 | Bond, Jr. | 340/614 |
| 4,773,260 | 9/1988 | Ohno et al. | 73/113 |
| 5,398,662 | 3/1995 | Igarashi et al. | 123/520 |
| 5,678,523 | 10/1997 | Hashimoto et al. | 123/520 |
| 5,775,307 | 7/1998 | Isobe et al. | 123/520 |
| 5,780,728 | 7/1998 | Takamori | 73/116 |

*Primary Examiner*—Jeffery A. Hofsass
*Assistant Examiner*—Ashok Mannava
*Attorney, Agent, or Firm*—Frishauf, Holtz, Goodman, Langer & Chick

[57] ABSTRACT

A residual fuel amount-estimating system for a fuel tank of an internal combustion engine installed in a vehicle. A pressure sensor detects the pressure within the fuel tank. The interior of the fuel tank is negatively pressurized, and a rate of change in the pressure within the fuel tank during negative pressurization is detected. A residual fuel amount within the fuel tank is estimated, based on the detected rate of change in the pressure within the fuel tank.

3 Claims, 7 Drawing Sheets

RESIDUAL FUEL AMOUNT-ESTIMATING SYSTEM FOR FUEL TANK OF INTERNAL COMBUSTION ENGINE

BACKGROUND OF THE INVENTION

1. Field of the Invention

This invention relates to a residual fuel amount-estimating system for a fuel tank of an internal combustion engine, which estimates an amount of residual fuel in the fuel tank of the engine installed in a vehicle.

2. Prior Art

In an internal combustion engine installed in a vehicle, detection of an amount of residual fuel in the fuel tank is generally carried out by means of a float-type fuel gauge such that a float with a smaller specific gravity than that of fuel is floated on the liquid level of fuel and the position of the float is electrically detected by the gauge.

The float-type fuel gauge widely used for detection of the residual fuel amount in the fuel tank, however, has the disadvantage that the amount of residual fuel cannot be correctly detected when the vehicle (fuel tank) is tilted.

SUMMARY OF THE INVENTION

It is the object of the invention to provide a residual fuel amount-estimating system for a fuel tank of an internal combustion engine, which is capable of accurately estimating a residual fuel amount in the fuel tank irrespective of the tilt of a vehicle in which the engine is installed.

To attain the above object, the present invention provides a residual fuel amount-estimating system for a fuel tank of an internal combustion engine installed in a vehicle, comprising:

pressure-detecting means for detecting pressure within the fuel tank;

negatively pressurizing means for negatively pressurizing an interior of the fuel tank;

pressure change-detecting means for detecting a rate of change in the pressure within the fuel tank during negative pressurization by the negatively pressurizing means; and estimating means for estimating a residual fuel amount within the fuel tank, based on the rate of change in the pressure within the fuel tank detected by the pressure change-detecting means.

Preferably, the estimating means estimates the residual fuel amount at a larger value as the rate of change in the pressure within the fuel tank detected by the pressure change-detecting means is larger.

Advantageously, the engine has an intake passage, an evaporative fuel passage extending between the intake passage and the fuel tank, and a control valve arranged across the evaporative fuel passage, for controlling an amount of evaporative fuel supplied from the fuel tank to the intake passage, the negatively pressurizing means including control means for opening the control valve at a constant opening over a predetermined time period during operation of the engine, and for calculating the rate of change in the pressure within the fuel tank detected by the pressure-detecting means during the opening of the control valve.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
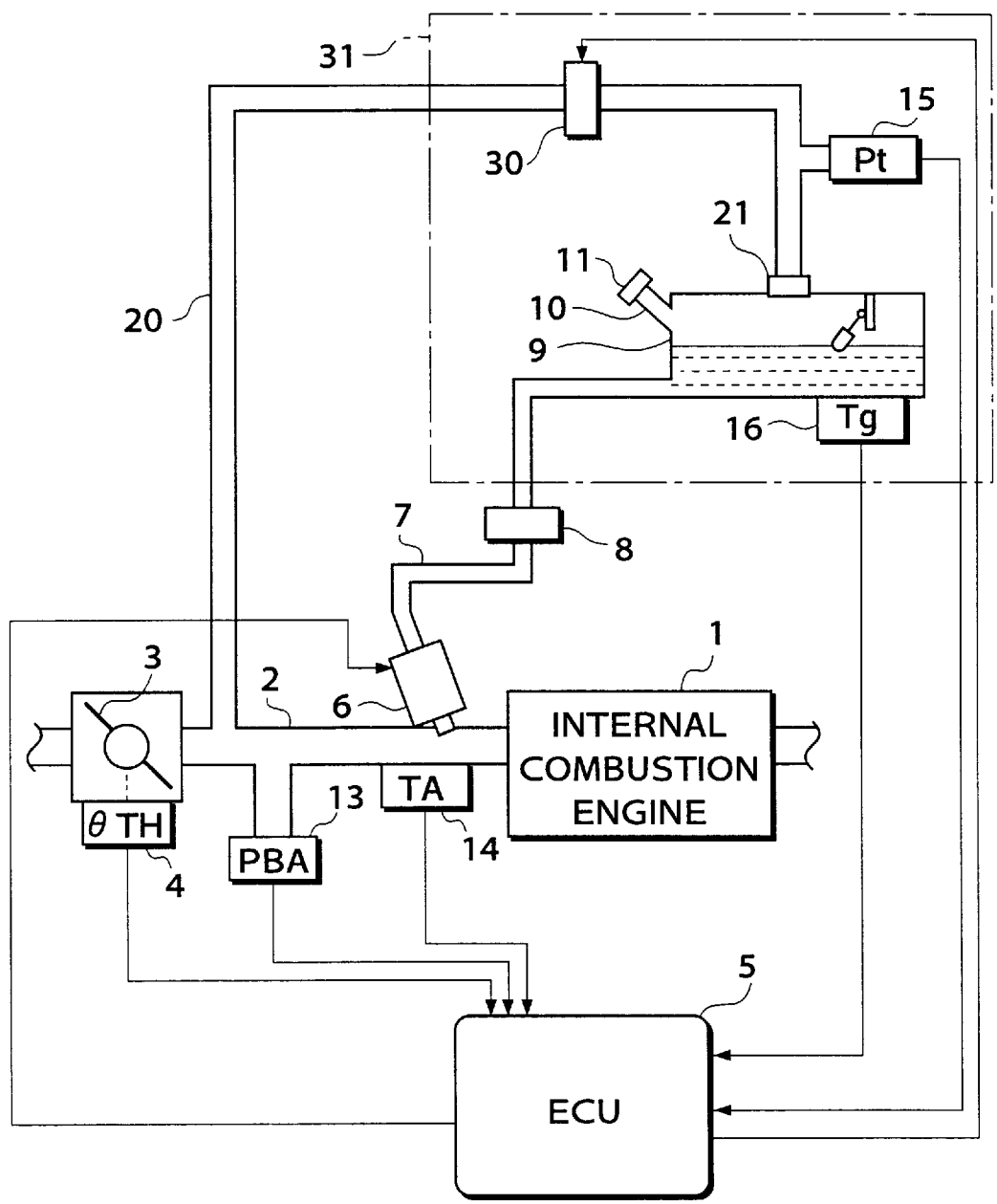
FIG. 1 is a block diagram schematically showing the arrangement of an internal combustion engine and an evaporative emission control system therefor, including a residual fuel amount-estimating system according to an embodiment of the invention.

Referring first to FIG. 1, there is illustrated the arrangement of an internal combustion engine and an evaporative emission control system therefor, including a residual fuel amount-estimating system according to an embodiment of the invention.

In the figure, reference numeral 1 designates an internal combustion engine (hereinafter simply referred to as "the engine") which is installed in a vehicle and has four cylinders, for instance. Arranged in an intake pipe 2 of the engine is a throttle valve 3. A throttle valve opening (θTH) sensor 4 is connected to the throttle valve 3, for generating an electric signal indicative of the sensed throttle valve opening θTH to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel tank 9 via a fuel supply pipe 7 with a fuel pump 8 arranged there across. The fuel tank 9 has an oil inlet 10 for refueling, which is provided with a filler cap 11 mounted thereon.

The fuel injection valves 6 are electrically connected to the ECU 5 to have their valve opening timing controlled by signals therefrom.

An intake pipe absolute pressure (PBA) sensor 13 and an intake air temperature (TA) sensor 14 are inserted into the intake pipe 2 at locations downstream of the throttle valve 3. The PBA sensor 13 detects absolute pressure PBA within the intake pipe 2, and the TA sensor 14 detects intake air temperature TA as outside air temperature. Inserted into the fuel tank 9 is a fuel temperature (Tg) sensor 16 for detecting temperature Tg of fuel in the fuel tank 9. Electric signals indicative of the detected parameters from these sensors are supplied to the ECU 5.

Next, an evaporative emission control system 31 will be described, which is comprised of the fuel tank 9, an evaporative fuel passage 20, etc.

The fuel tank 9 is connected through the evaporative fuel passage 20 to the intake pipe 2 at a location downstream of the throttle valve 3. Arranged across the evaporative fuel passage 20 are a tank internal pressure (Pt) sensor 15 for detecting the pressure (absolute pressure) within the fuel tank 9, and a tank pressure control valve 30 for opening and closing the passage 20. Although in the illustrated embodiment, the tank internal pressure (Pt) sensor 15 is inserted into the evaporative fuel passage 20 at a location close to the fuel tank 9, it may be directly inserted into the fuel tank 9. An electric signal indicative of the sensed tank internal pressure Pt is supplied to the ECU 5. The control valve 30 is an electromagnetic valve which controls the flow rate of evaporative fuel generated in the fuel tank 9 and supplied to the intake pipe 2 by changing the on-off duty ratio of a control signal supplied from the ECU 5 which controls the operation of the control valve 30. Alternatively, the control valve 30 may be formed by an electromagnetic valve which has its opening linearly changed.

Provided in the fuel tank 9 is a cut-off valve 21 which is arranged at an end of the evaporative fuel passage 20 opening into the fuel tank 9. The cut-off valve 21 is a float valve which is closed when the fuel tank 9 is fully charged or the tilt thereof is increased.

The ECU 5 is comprised of an input circuit having the functions of shaping the waveforms of input signals from various sensors, shifting the voltage levels of sensor output signals to a predetermined level, converting analog signals from analog-output sensors to digital signals, and so fourth, a central processing unit (hereinafter referred to as "the CPU"), a memory circuit storing various operational programs which are executed by the CPU and for storing results of calculations therefrom, etc., and an output circuit which delivers driving signals to the fuel injection valves 6, the control valve 30, etc.

The CPU of the ECU 5 operates in response to the above-mentioned signals from the sensors such as the θTH sensor 4 and the PBA sensor 13, to control an amount of fuel supplied to the engine 1, etc., and determines the opening of the control valve 30 in response to output signals from the fuel temperature sensor 16, the tank internal pressure sensor 15, etc.

Figure 2:
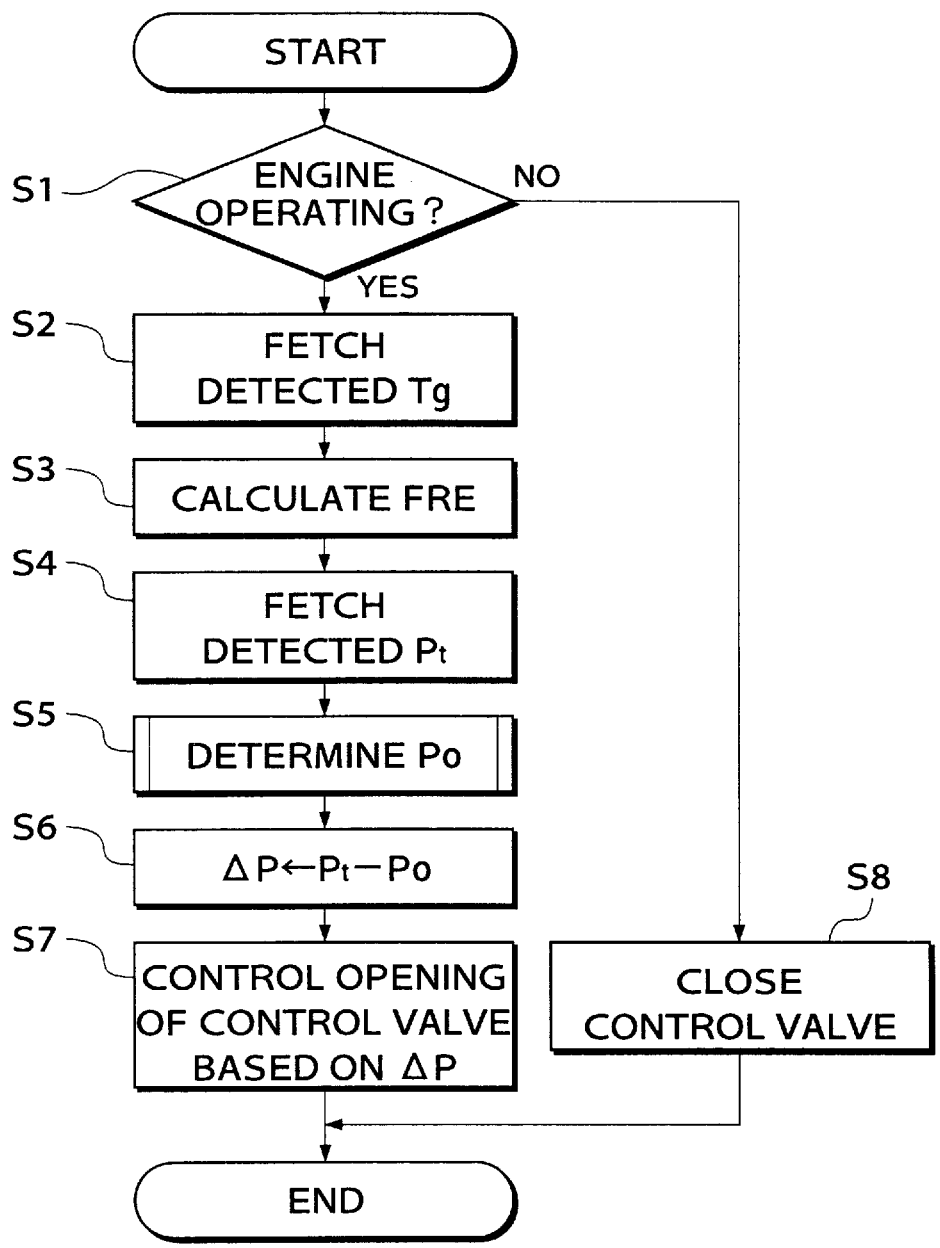
FIG. 2 is a flowchart showing a routine for carrying out an evaporative emission control process by the evaporative emission control system, according to the embodiment.

FIG. 2 shows a routine for controlling the opening of the control valve 30, which is executed at predetermined time intervals (e.g. 100 msec).

First, at a step S1, it is determined whether or not the engine 1 is operating, e.g. by detecting cranking of the engine 1. If the engine is operating, a value of the fuel temperature Tg within the fuel tank 9 detected by the fuel temperature sensor 16 is fetched at a step S2, and a process of estimating a residual fuel amount FR within the fuel tank 9 is executed at a step S3, which will now be described with reference to FIG. 4.

Figure 4:
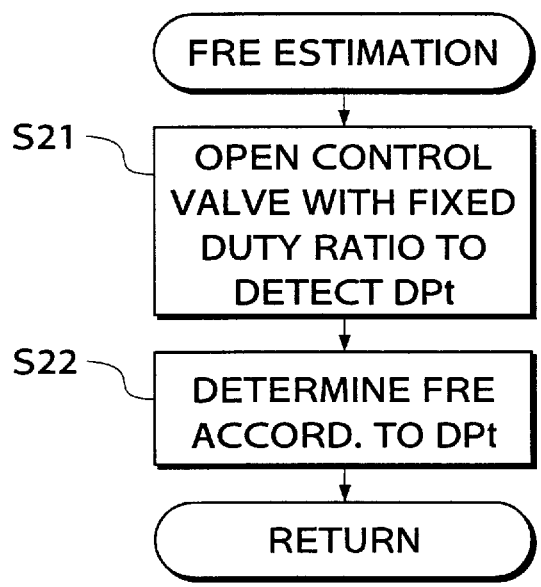
FIG. 4 is a flowchart showing a subroutine for estimating a residual fuel amount FRE in the fuel tank, which is executed at a step S3 in FIG. 2.
Figure 5A:
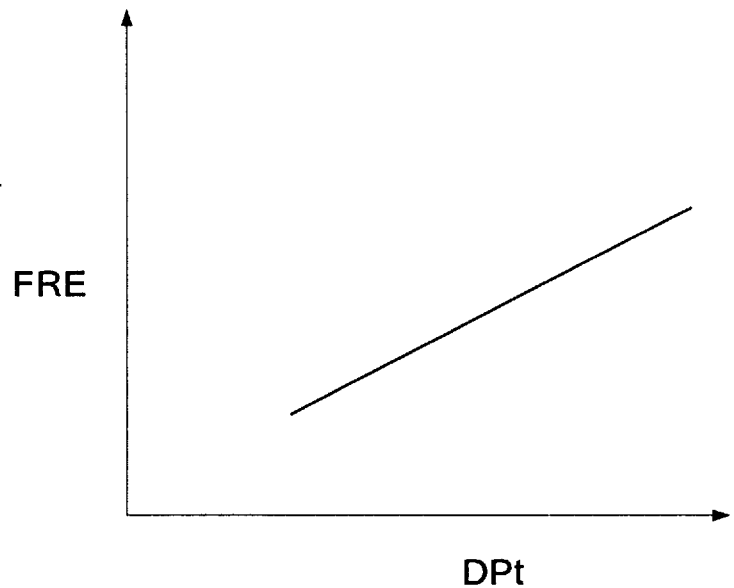
FIG. 5A shows an FRE table which is used at a step S22 in FIG. 4.

First, at a step S21 in FIG. 4, a control signal having a fixed duty ratio is supplied to the control valve 30 to open the same at a constant opening, to thereby carry out negative pressurization of the interior of the fuel tank 9 over a predetermined time period (e.g. 5 sec). Then, a rate of change DPt in the tank internal pressure (difference between a pressure value assumed at the start of negative pressurization and a pressure value assumed upon the lapse of the predetermined time period or 5 seconds from the start of negative pressurization) is detected based upon an output signal from the tank internal pressure sensor 15. The rate of change DPt corresponds to an amount of change in the tank internal pressure Pt per unit time during negative pressurization. Then, an FRE table shown in FIG. 5A is retrieved according to the rate of change DPt, to thereby determine an estimated residual fuel amount FRE at a step S22.

Figure 5B:
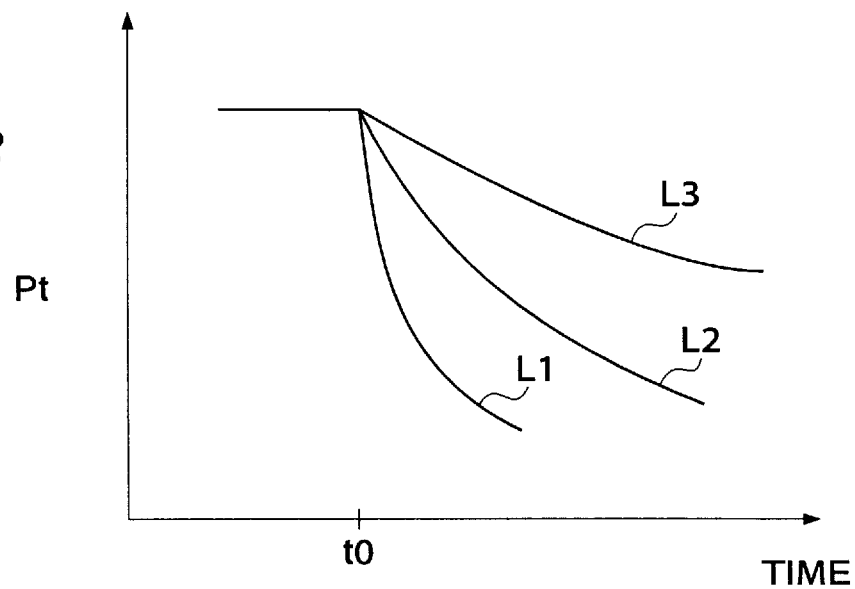
FIG. 5B shows a Pt table for determining tank internal pressure Pt depending on the estimated residual fuel amount FRE.

When negative pressurization is carried out with the opening of the control valve 30 set to a fixed opening, the rate of change (rate of decrease) in the tank internal pressure Pt tends to increase as the residual fuel amount is larger. More specifically, as shown in FIG. 5B, when negative pressurization is started at a time point t0 with a large residual fuel amount contained in the fuel tank 9, the tank internal pressure Pt decreases along a curve L1. On the other hand, as the residual fuel amount becomes smaller, the tank internal pressure Pt decreases along a curve L2, and then along a curve L3. Accordingly, the FRE table of FIG. 5A is set such that the estimated residual fuel amount FRE increases as the rate of change DPt is larger.

According to the residual fuel estimation in the present embodiment, the estimated residual fuel amount FRE is determined from the rate of change DPt in the tank internal pressure Pt during negative pressurization, and therefore an accurate value of the residual fuel amount can be obtained irrespective of the tilt of the vehicle (i.e. fuel tank).

Referring again to FIG. 2, at a step S4, a value of the tank internal pressure Pt detected by the tank internal pressure sensor 15 is fetched. Then, at a step S5, a desired pressure value (absolute pressure) Po (mmHg) within the fuel tank 9 is determined based upon the detected fuel temperature Tg and the estimated residual fuel amount FRE, according to a manner of setting the desired pressure value Po, described hereinafter with reference to FIG. 6. The desired pressure value Po is set to such a negative value that the interior of the fuel tank 9 is excessively negatively pressurized to a higher degree than required, in view of an expected increase in the tank internal pressure so as to maintain negative pressure within the fuel tank 9 even after the engine 1 is stopped.

Such an expected increase in the tank internal pressure Pt is caused by the following factors: That is, the fuel contains ingredients which evaporate at temperatures lower than the fuel temperature, due to a heat held by the fuel at the fuel temperature, and part of the fuel evaporates with a rise in the fuel temperature caused by elevation of the outside air temperature TA.

Then, a difference ΔP between the tank internal pressure Pt and the desired pressure value Po is calculated at a step S6, and the opening of the control valve 30 is controlled such that the difference ΔP becomes equal to 0 at a step S7, followed by terminating the present routine.

If it is determined at the step 1 that the engine 1 is not operating or in stoppage, the control valve 30 is closed by the CPU of the ECU 5 at a step S8 so as to maintain negative pressure within the fuel tank 9, which has been controlled to the desired pressure value Po, followed by terminating the present routine.

With the above described construction and control of the evaporative emission control system, when the engine 1 is operating, the opening of the control valve 30 is controlled to introduce negative pressure in the intake system 2 into the fuel tank 9, to thereby control and hold the tank internal pressure Pt to and at the desired pressure value Po. As a result, the fuel tank 9 is held in the negatively pressurized state not only during operation of the engine 1 but also during stoppage of the same, whereby it is possible to prevent evaporative fuel in the fuel tank 9 from emitting into the air even if the filler cap 11 is removed for refueling.

Next, description will be made of a manner of setting the desired pressure value Po within the fuel tank 9, which is executed at the step S5 in FIG. 2, with reference to FIG. 3.

Figure 3:
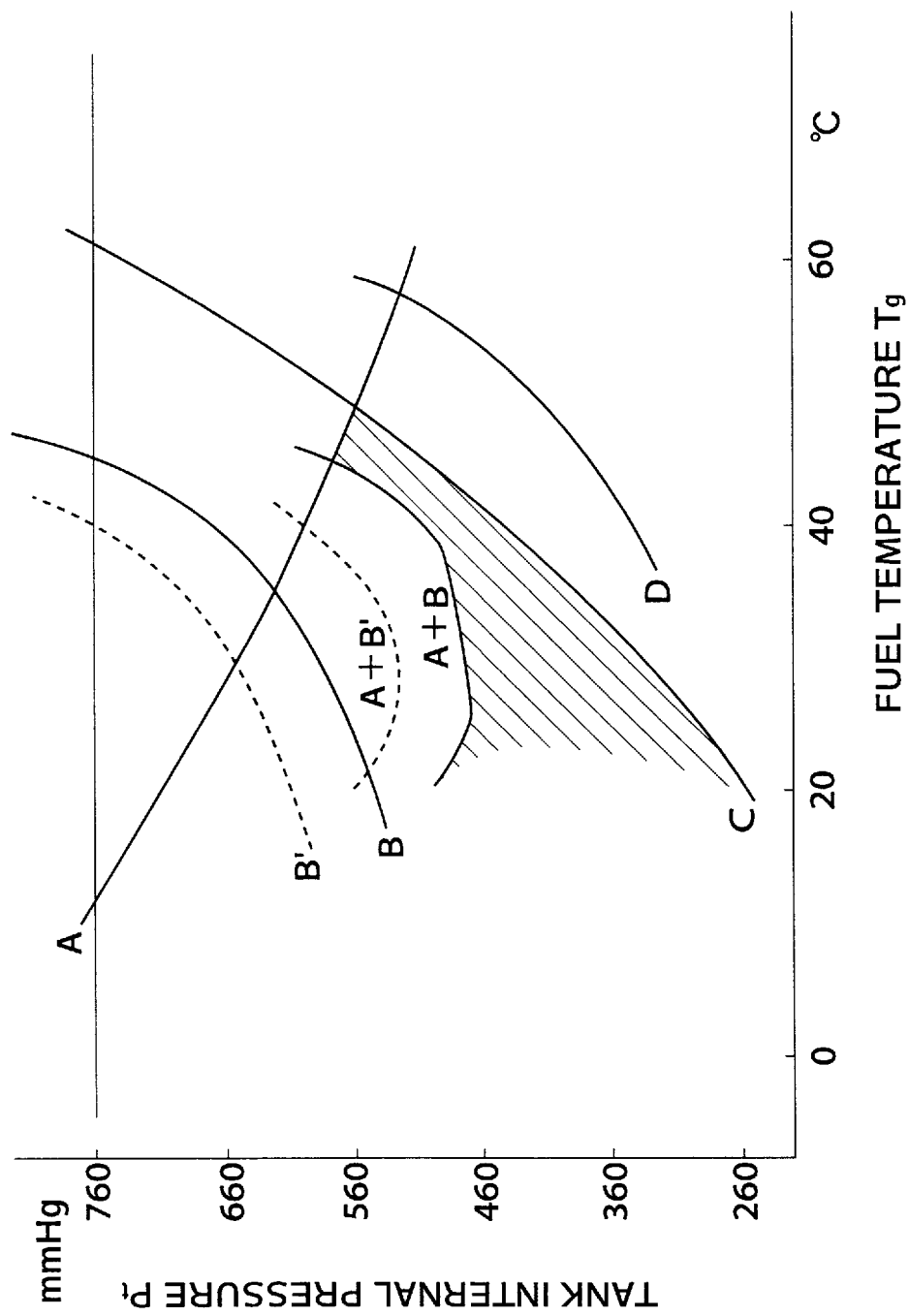
FIG. 3 is a graph useful in explaining a manner of determining a desired pressure value Po within a fuel tank appearing in FIG. 1.

Pressure values within a range shown in FIG. 3 to which the desired pressure value Po is to be set, are stored in the memory circuit of the ECU 5 in the form of a map.

In FIG. 3, the abscissa indicates the fuel temperature Tg (°C.) within the fuel tank 9, and the ordinate the tank internal pressure Pt (mmHg). The tank internal pressure Pt is shown in absolute pressure value, and a lower portion of the ordinate indicates a lower pressure value.

Next, curves A, B, A+B, C, and D will be described hereinbelow.

The curve A indicates an upper limit value of the desired pressure value Po to which the interior of the fuel tank 9 can be excessively negatively pressurized to a higher degree than required during traveling of the vehicle, such that the negative pressure within the fuel tank 9 is held even after the engine 1 is stopped when the negative pressurization of the fuel tank 9 is terminated. That is, the upper limit value of the desired pressure value Po indicated by the curve A is a value to or below which the desired pressure value Po is to be set in view of an increase in the tank internal pressure Pt due to evaporation of the ingredients of the fuel, which evaporate at temperatures lower than the detected fuel temperature Tg, due to a heat held by the fuel at the fuel temperature Tg within the fuel tank 9, immediately after the engine 1 is stopped. The opening of the control valve 30 is controlled such that the tank internal pressure Pt becomes equal to or below the curve A irrespective of the fuel temperature Tg. The curve A is set such that the higher the fuel temperature Tg, the lower the tank internal pressure Pt. That is, the tank internal pressure Pt should be decreased as the fuel temperature Tg is higher.

The curve B indicates an upper limit value of the desired pressure value Po to which the interior of the fuel tank 9 can be excessively negatively pressurized to a higher degree than required during traveling of the vehicle such that the negative pressure within the fuel tank 9 is held even after the engine 1 is stopped when the negative pressurization of the fuel tank 9 is terminated, but the upper limit value of the desired pressure value Po indicated by the curve B is a value to or below which the desired pressure value Po is to be set in view of an increase in the tank internal pressure Pt due to a rise of the outside air temperature TA to a predetermined highest possible temperature 45° C. during stoppage or parking of the vehicle and hence a rise of the fuel temperature Tg to 45° C. The highest possible outside air temperature of 40.6° C. is set when the vehicle is designed. In the present embodiment, however, it is set to the stricter value of 45° C. The curve B is set such that the higher the fuel temperature Tg, the higher the tank internal pressure Pt. In other words, the curve B indicates that the more the fuel temperature approaches to the highest possible outside air temperature, the smaller the influence of increase of the outside air temperature.

The curve A+B is a curve which satisfies both of the above-mentioned conditions of the curves A and B. According to the curve A+B, the tank internal pressure Pt assumes the minimum value when the fuel temperature Tg is equal to or close to 25° C. The opening of the control valve 30 is controlled such that the tank internal pressure Pt becomes equal to or below the curve A+B, irrespective of the fuel temperature Tg.

The curve C indicates a lower limit value of the pumping force of the fuel pump 8 which delivers fuel from the fuel tank to the engine 1, i.e. the lower limit value of the desired pressure value Po. If the tank internal pressure Pt is below the curve C, the fuel pump 8 cannot pump fuel out of the fuel tank 9, and therefore the desired pressure value Po needs to be set to a value at least equal to or above the curve C. The curve C is set such that the higher the fuel temperature Tg, the higher the tank internal pressure Pt. Further, it should be noted that the lower limit value of the desired pressure value Po depicted by the curve C is always lower than the upper limit value of the desired pressure value Po depicted by the curve A+B.

Lastly, the curve D indicates a limit line at or above which the fuel can preserve its properties as fuel (i.e. a limit line below which fuel or gasoline becomes deteriorated to such a degree that it cannot be used as fuel). If the tank internal pressure Pt lowers below the curve D, the volatile ingredients of the fuel in the fuel tank 9 evaporate, and therefore the fuel cannot maintain its properties as fuel. The curve D is set such that the higher the fuel temperature Tg, the higher the tank internal pressure Pt. It should be noted that the limit line depicted by the curve D is always lower than the lower limit value of the desired pressure value Po depicted by the curve C.

To hold the fuel tank 9 in the negatively pressurized state even after the engine 1 is stopped when the negative pressurization of the fuel tank 9 is terminated, the desired pressure value Po should be set to such a value as satisfies all the conditions defined by the curves A, B, A+B, C, and D. More specifically, the desired pressure value Po is set to values falling within a range indicated by the shaded portion in FIG. 3 according to the fuel temperature Tg.

Figure 7A:
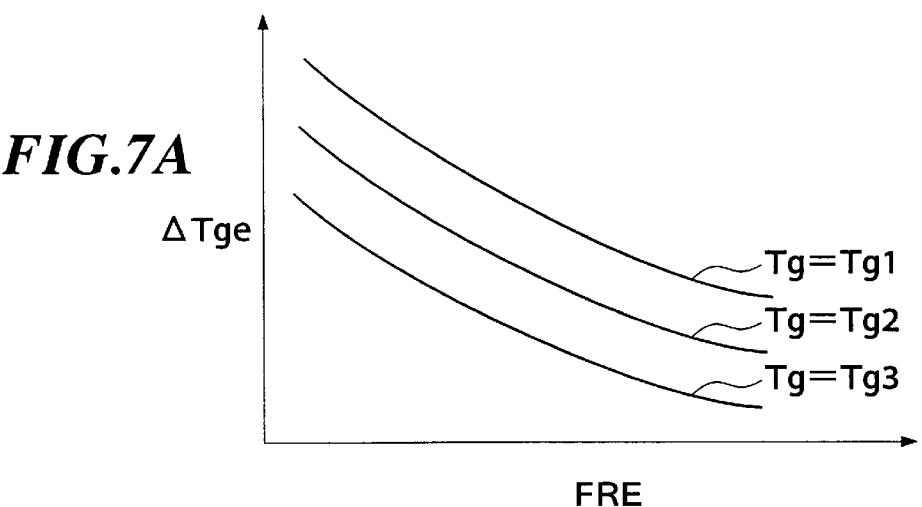
FIG. 7A shows a ΔTge table which is used at a step S11 in FIG. 6.

The present embodiment contemplates the fact that the degree of influence of the outside air temperature TA on the fuel temperature Tg changes depending on the residual fuel amount FR in the fuel tank 9. That is, according to the present embodiment, the desired pressure value Po is set according to the residual fuel amount in addition to the fuel temperature Tg. FIG. 7C shows changes in the fuel temperature Tg with changes in the outside air temperature TA indicated by the solid line. As is understood from the figure, when the residual fuel amount FR is small, a change in the outside air temperature TA is directly reflected on the fuel temperature Tg with a predetermined time lag as indicated by the broken line. On the other hand, when the residual fuel amount FR is large, a change in the outside air temperature TA is reflected on the fuel temperature Tg in a considerably smoothed manner as indicated by the dot-dash line.

The curve B in FIG. 3 indicates the upper limit value of the Po value which is obtained when a change in the outside air temperature TA is almost directly reflected on the fuel temperature Tg. On the other hand, if the residual fuel amount FR is large, the upper limit value is shifted to a larger value as indicated by a curve B'. Therefore, the desired pressure value Po can be set to a value within a range defined by a curve A+B' and the curve C, which is larger than the shaded range defined by the curves A+B and C in FIG. 3.

Figure 6:
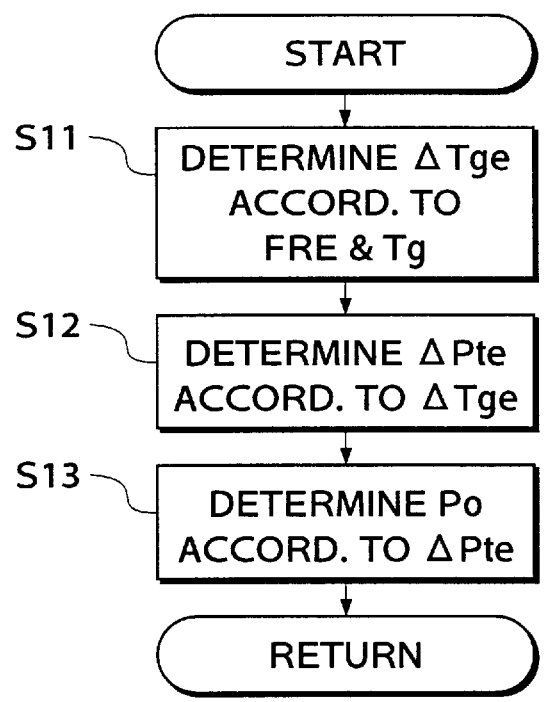
FIG. 6 is a flowchart showing a subroutine for determining the Po value, which is executed at a step S5 in FIG. 2.

FIG. 6 shows a subroutine for determining the desired pressure value Po with the residual fuel amount taken into account, which is executed at the step S5 in FIG. 2. At a step S11, a ΔTge table shown in FIG. 7A is retrieved according to the fuel temperature Tg and the estimated residual fuel amount FRE, to thereby determine an estimated amount of increase in the fuel temperature Tg during stoppage of the engine 1 (hereinafter referred to as "the estimated temperature increase amount") ΔTge. The ΔTge table is set with the characteristics of the fuel temperature Tg shown in FIG. 7C taken into account, such that the estimated temperature increase amount ΔTge decreases as the estimated residual fuel amount FRE is larger. The ΔTge table is provided with ΔTge values corresponding to respective predetermined fuel temperature values Tg1, Tg2, and Tg3 (Tg1<Tg2<Tg3). When the fuel temperature Tg assumes a value other than the predetermined temperature values Tg1 to Tg3, the estimated temperature increase amount ΔTge is calculated by interpolation.

Figure 7B:
FIG. 7B shows a ΔPte table which is used at a step S12 in FIG. 6.
Figure 7C:
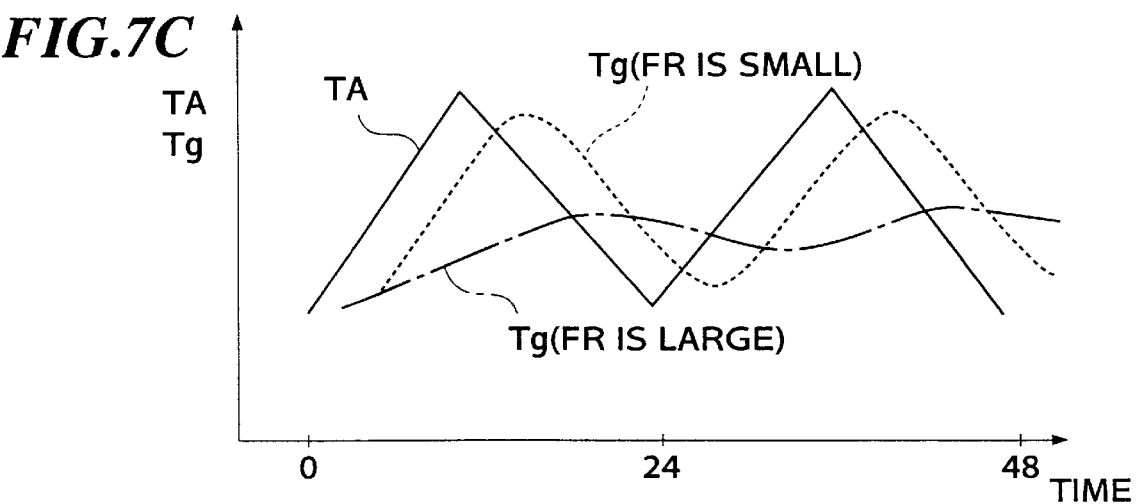
FIG. 7C is a graph showing the relationship between outside air temperature TA and fuel temperature Tg with the lapse of time.

At the following step S12, a ΔPte table shown in FIG. 7B is retrieved according to the estimated temperature increase amount ΔTge, to thereby determine an estimated amount of increase in the tank internal pressure Pt during stoppage of the engine 1 (hereinafter referred to as "the estimated tank internal pressure increase amount") ΔPte. The ΔPte table is set such that the estimated tank internal pressure increase amount ΔPte increases as the estimated temperature increase amount ΔTge is larger.

Then, the desired pressure value Po is determined according to the estimated tank internal pressure increase amount ΔPte such that the conditions described above with reference to FIG. 3 are satisfied. That is, the estimated tank internal pressure increase amount ΔPte is added to the desired pressure value Po obtained from the map of FIG. 3, to thereby determine a value of the Po value. Further, since the estimated tank internal pressure increase amount ΔPte only satisfies the conditions of the curves B and B', the desired pressure value Po is determined so as to also satisfy the conditions of the curves A and C as well.

Alternatively, in place of adding the ΔPte value to the desired pressure value Po, a plurality of Po maps corresponding to different values of the ΔPte value may be prepared, and a map corresponding to the ΔPte value determined at the step S12 may be selected as the final desired pressure value Po.

According to the present embodiment, the control valve 30 is controlled to introduce the negative pressure within the intake pipe 2 into the fuel tank 9 during operation of the engine 1, whereby the pressure within the fuel tank 9 is controlled to the predetermined desire pressure value Po. Thus, the fuel tank 9 is held under negative pressure even if the outside air temperature rises to 45° C. during stoppage of the engine 1. As a result, evaporative fuel in the fuel tank 9 can be prevented from emitting into the air even when the filler cap 11 is removed for refueling.

Further, since the desired pressure value Po is determined according to the estimated residual fuel amount FRE in the fuel tank 9, the desired pressure value Po can be controlled to an optimum value depending on the residual fuel amount in the fuel tank 9. For example, when the residual fuel amount is large, the desired pressure value Po is set to a value larger than a value assumed when the residual fuel amount is small, which prevents excessive negative pressurization of the fuel tank 9, to thereby enable negative pressurization of the fuel tank 9 to be easily carried out in a short time period. In addition, the estimated residual fuel amount FRE is employed in place of an output from a float-type residual fuel amount sensor for determining the Po value, to thereby accurately estimate the residual fuel amount in the fuel tank irrespective of the tilt of the vehicle or the fuel tank, which makes it possible to determine the optimum desired pressure value Po.

In the above described embodiment, a predetermined value of 45° C. is selected as the highest possible outside air temperature to control the tank internal pressure Pt. However, temperature-setting means may be provided to freely set or select the highest possible outside air temperature to different values depending upon the outside air temperature of the vehicle, for example, to 45° C. in summer, and to 25° C. in winter, whereby the value of negative pressure within the fuel tank 9 can be controlled to a value appropriate to the ambient temperature of the vehicle, thus avoiding the interior of the fuel tank 9 from being under excessive negative pressure.

Further, in the above embodiment, the interior of the fuel tank 9 is excessively negatively pressurized to a higher degree than required by utilizing negative pressure in the intake pipe of the engine during operation thereof, so that the negatively pressurized state is maintained even after stoppage of the engine. This, however, is not limitative. Alternatively, the interior of the fuel tank 9 may be negatively pressurized by a pump driven, e.g. by a battery of the vehicle.

What is claimed is:

1. A residual fuel amount-estimating system for a fuel tank of an internal combustion engine installed in a vehicle, comprising:

pressure-detecting means for detecting pressure within said fuel tank;

negatively pressurizing means for negatively pressurizing an interior of said fuel tank;

pressure change-detecting means for detecting a rate of change in said pressure within said fuel tank during negative pressurization by said negatively pressurizing means; and estimating means for estimating a residual fuel amount within said fuel tank, based on said rate of change in said pressure within said fuel tank detected by said pressure change-detecting means.

2. A residual fuel amount-estimating system as claimed in claim 1, wherein said estimating means estimates said residual fuel amount at a larger value as said rate of change in said pressure within said fuel tank detected by said pressure change-detecting means is larger.

3. A residual fuel amount-estimating system as claimed in claim 1, wherein said engine has an intake passage, an evaporative fuel passage extending between said intake passage and said fuel tank, and a control valve arranged across said evaporative fuel passage, for controlling an amount of evaporative fuel supplied from said fuel tank to said intake passage, said negatively pressurizing means including control means for opening said control valve at a constant opening over a predetermined time period during operation of said engine, and for calculating said rate of change in said pressure within said fuel tank detected by said pressure-detecting means during the opening of said control valve.

* * * * *